(No Model.)  5 Sheets—Sheet 1.

J. H. MYERS.
VOTING MACHINE.

No. 415,548.  Patented Nov. 19, 1889.

WITNESSES—
H. G. Phillips.
Fred F. Church

INVENTOR—
Jacob H. Myers
BY Church & Church
his ATTORNEYS—

(No Model.)  5 Sheets—Sheet 3.

J. H. MYERS.
VOTING MACHINE.

No. 415,548. Patented Nov. 19, 1889.

WITNESSES-
H. G. Phillips.
Fred F. Church

INVENTOR-
Jacob H. Myers
BY Church & Church
His ATTORNEYS-

(No Model.) 5 Sheets—Sheet 4.

J. H. MYERS.
VOTING MACHINE.

No. 415,548. Patented Nov. 19, 1889.

WITNESSES—
H. G. Phillips.
Fred F. Church.

INVENTOR—
Jacob H. Myers
BY Church & Church
his ATTORNEYS—

N. PETERS, Photo-Lithographer, Washington, D. C.

(No Model.) 5 Sheets—Sheet 5.

J. H. MYERS.
VOTING MACHINE.

No. 415,548. Patented Nov. 19, 1889.

WITNESSES—
H. G. Phillips.
Fred F. Church

INVENTOR—
Jacob H. Myers
BY Church Church
his ATTORNEYS—

UNITED STATES PATENT OFFICE.

JACOB H. MYERS, OF ROCHESTER, NEW YORK.

VOTING-MACHINE.

SPECIFICATION forming part of Letters Patent No. 415,548, dated November 19, 1889.

Application filed April 29, 1889. Serial No. 309,112. (No model.)

*To all whom it may concern:*

Be it known that I, JACOB H. MYERS, of the city of Rochester, county of Monroe and State of New York, have invented certain new and useful Improvements in Voting Apparatus; and I do hereby declare the following to be a full, clear, and exact description of the same, reference being had to the accompanying drawings, forming a part of this specification, and to figures and letters of reference marked thereon.

My present invention relates to voting or balloting apparatus, and has for its objects to provide one by the employment of which an honest vote can be had and counted without liability of voters being intimidated, the balloting being secret, or of their voting more than once for the same candidate or different candidates for the same office, and as the votes are counted as they are cast the total number can be ascertained rapidly and accurately at the close of the polls without the necessity of counting by hand the separate ballots, though this may be done as a check or verification should it be necessary or desirable.

With these objects in view the invention consists in certain novel constructions and combinations of parts, all as will be hereinafter fully described, and the novel features pointed out particularly in the claims at the end of this specification.

In the drawings.

Similar letters and numerals of reference in the several figures denote similar parts.

In carrying out my present invention I contemplate the use of ballots of uniform size and shape for all the candidates, preferably in the form of metallic disks, the choice of the voter being indicated by the place wherein said ballot is placed, and for the purpose of preventing his voting for more than one of the candidates for the same office or voting twice for the same candidate I so arrange the parts that the ballot will not be deposited in the ballot-box nor counted until the voter leaves the proximity of the place where he has deposited it. With the object in view of accomplishing this result and also of providing for a secret ballot, I prefer to employ a booth or chamber of special construction, which the voter enters to cast his ballot alone, and upon his exit therefrom the ballots will be counted and deposited in the proper receptacles. I will first describe the construction of this booth or chamber and the manner in which the depositing devices are operated, and then the ballot-receiving devices.

The letter A represents a booth or chamber containing the operating parts, preferably constructed of sheet metal of suitable thickness—say three-eighths of an inch—and formed in sections adapted to be bolted together and capable of being readily taken apart and stored or set up in the room or at the place where the election is to be held. Extending lengthwise of this chamber A is a partition or wall B, dividing the booth into compartments or chambers, the one C containing the ballot-boxes and counting mechanism and accessible only to the judges and inspectors of elections, and the other D to which the voter has access to deposit his ballot. The front of the booth is provided with doors E and F, the former constituting the entrance-door and provided with a spring-latch having an operating-handle $e$ on the outside, and the latter having a spring-lock thereon, with its operating-handle $f$ on the inside of the booth or room and serving as an exit-door, the construction of both being such that a voter must enter through door E and emerge through F. Inside the compartment D is a partition G, forming, with an interior door H, a compartment or vestibule T inside the door F, said door H being provided with a spring-lock and operating-knob $j$ on the side toward D, so that when one passes into the vestibule and closes the door he cannot pass back again, not being able to open the door from this side; but he may pass out through door F, which opens toward him, not, however, until he closes door H, which unlocks F. In the upper part of the vestibule or chamber T are pivoted two levers K K′, connected at their inner proximate ends by a slot-and-pin connection, as shown, the one K with its outer end arranged to project in the path described by the door F and prevent its being opened, and the other K′ adapted to be struck and operated by the door H when closed to move the end of K out of the path of F.

Figure 1:
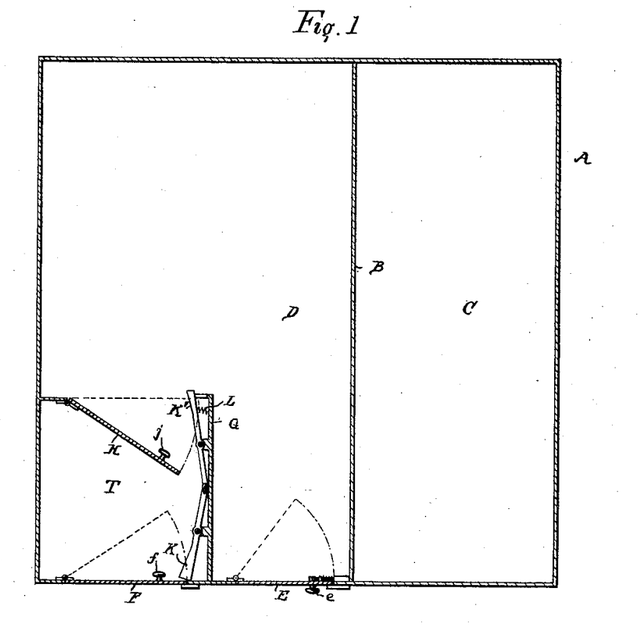
Figure 1 represents a horizontal sectional view of a voting booth or room constructed in accordance with my invention.

L represents a spring operating to press the outer ends of the levers into the paths of the doors, locking F, if the door H is open, as shown in Fig. 1; but when the latter is closed the spring is compressed and the door F released.

As stated, the ballot receiving, depositing, and counting devices are situated in compartment C, and in the partition B are provided a series of apertures $b$, in which the ballots, in the shape of metallic disks, are deposited, but are held in proximity to the apertures by mechanism presently described until the voter passes out of door F, when this mechanism will be operated as follows:

At the upper part of the vestibule is pivoted a bent lever M, having its shorter end M′ projecting between the edge of door F and the door-casing, and its longer arm formed with a substantially straight portion $M^2$, and beyond this with a portion curved on an arc substantially the same as that described by the edge of the door F, while its extreme end is provided with a small hook or stop $M^3$. On the door F is arranged a small roller or projection $n$, co-operating with the lever M when the door is opened, while the lever through a rod N, pivoted to its rear side, operates the ballot depositing and counting mechanism.

Figures 2, 3:
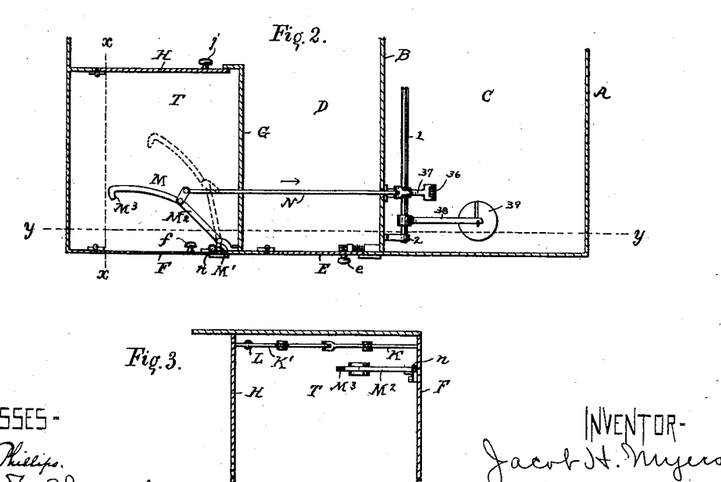
Fig. 2, a similar view taken just below Fig 1.
Fig. 3, a sectional view of the booth, taken on the line $x$ $x$ of Fig. 2.

The operation of the described devices will now be understood. The voter entering the booth through door E closes the latter and places his metallic disks or ballots in the appropriate slots, and then by means of handle $j$ opens door H, his only means of exit, and passes into the vestibule T. The opening of door H permits spring L to project lever K in the path of door F, preventing its being opened until the voter passes into the vestibule and closes door H behind him. This will release door F, and the lock on door H catching, as it must do in order to fully operate the unlocking device K K′, he can only emerge through door F, which he does. When door F is opened, its edge or the roller thereon moves along the lever M and turns it back on its pivot, causing the movement of link N in the direction of the arrow, Fig. 2, operating the ballot-depositing apparatus until the curved portion of the lever is reached, when the lever will cease to move, being curved in the arc traversed by the door-edge. The door is moved in a direction to close it until its edge reaches the portion $M^2$, when the weight or spring employed to return the ballot-manipulating devices to first position, operating through the lever, will push it closed, and, the latch catching, it will be prevented from being opened from the exterior of the booth, the door engaging the end of the lever and preventing the operation of the ballot-depositing device except by the opening of the door again. By forming the portion of the lever M on the arc traversed by the door-edge I insure proper operation of the ballot-depositing apparatus every time the door is opened and prevent the liability of any excessive motion deranging the apparatus.

Figure 5:
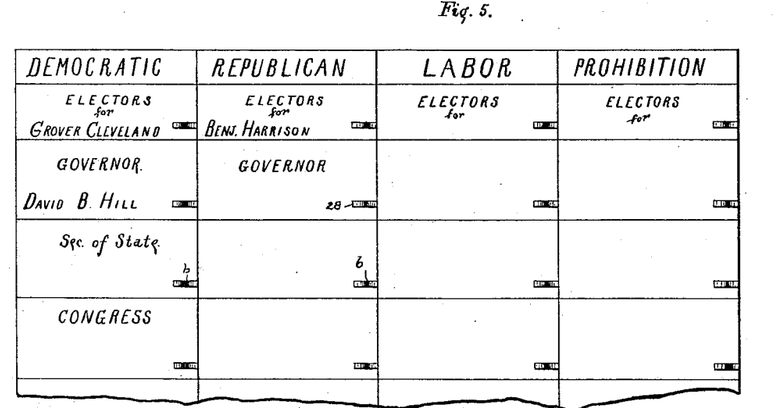
Fig. 5, a front view of the partition-wall where ballots are deposited.

The partition or wall B is divided off into suitable vertical divisions or spaces, as in Fig. 5, one division being devoted to the candidates of a particular party or denomination, and as many divisions may be made as desired, though I have shown only four, devoted to the "Democratic," "Republican," "Labor," and "Prohibition" parties, each being designated by a sign placed at the top. In each of the divisions are placed signs bearing the names of the candidates and the particular offices for which they are nominated, as, if the apparatus is to be employed for a general election, the first of the signs in all the divisions may contain the words "Electors for," giving the Presidential candidate's name, and the second "Governor" and the candidate's name, the third "Secretary of State," and so on down through the list of all the nominees. A number of small slots or apertures $b$ are formed in the partition—one opposite each of the candidates' names—for the introduction of the ballots, and the slots of all the candidates for the same office should be in substantially the same plane, as shown in Fig. 5.

As in the present embodiment of my invention the devices for receiving the ballots for the candidates for each single office are somewhat dependent upon each other, while the devices for receiving and handling the ballots for different offices are duplications, I will first describe the construction and operation of a single set and then describe the manner of connecting them and causing their simultaneous operation.

On the rear side of partition B and within chamber C, I arrange a number of horizontal shafts 1 1 1, mounted in bearings 2 2 and corresponding to the number of horizontal lines of apertures, and upon said shafts, just back of the apertures, are secured ballot-supports 3 3, constructed, as in Figs. 6, 7, 11, and 15, with a lower supporting-plate 4, and above this a small finger 5, a space being left between said plate and finger sufficient for the reception of a single ballot, which, as before mentioned, are in the form of disks. These plates are slightly below the level of the shafts and when in normal position project in proximity to aperture $b$, so that ballots placed in the latter will be supported upon them, and when the shafts are rotated forward the supports will be moved downward, the fingers 5 forcing the ballots down, permitting them to slide off into the counting devices and be conveyed to the ballot-boxes.

Figure 9:
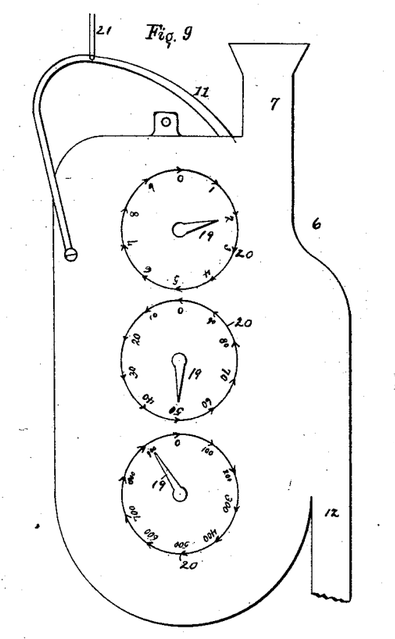
Figs. 9 and 10, respectively, side and sectional views of one of the counters.
Figure 10:
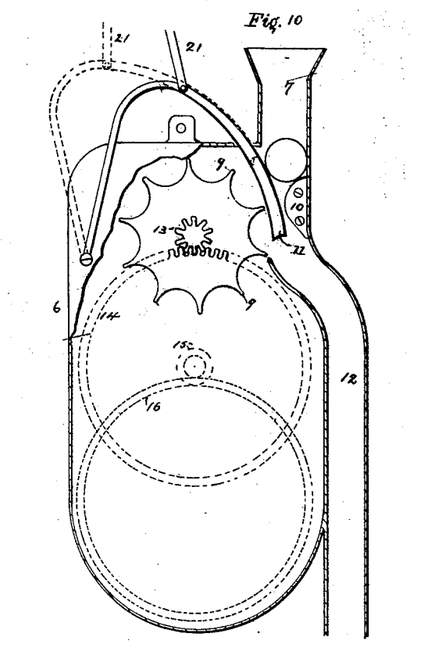
Figure 11:
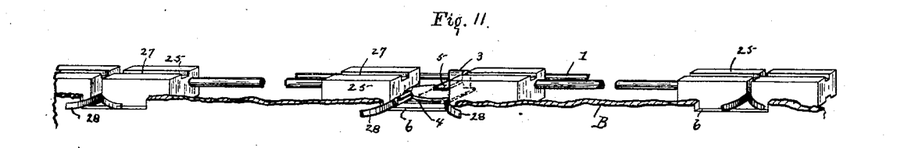
Fig. 11, a perspective view, partly in section, showing the slots in the partition, the spacing-slides, and one of the ballot-supporting plates.

The counters 6, one being arranged beneath each of the plates 4, are constructed as represented in Figs. 9 and 10, and consist of a casing having at the top flattened tubular conduit 7, having a flaring mouth into which the ballot is dropped from the support 3. Projecting into this passage 7 from one side is a counting-wheel 8, having in its periphery a series of recesses, preferably ten in number, formed by teeth 9 on said wheel, which project into passage 7 at a point where it is narrowed by a plate or abutment 10, placed on the opposite side, as shown, the distance between the ends of the teeth and said abutment being less than the diameter of the disks, so that as the latter are dropped into the passage they will be supported by the teeth 9, and, their weight not being sufficient to move said wheel, they will remain in this position until pushed down by the end of a lever 11, pivoted on the casing, as shown, and operating through a slot in the top. This lever end passes down between said wheel 8 and the abutment 10, touching neither of them, but when a ballot-disk is supported by the projection 9 the operation of the lever will push it down and cause the wheel to turn until the disk passes the abutment, when it will roll or slide down conduit 12 at the side and pass into the ballot-box provided for it. Secured to the hub of the wheel 8 is a small pinion 13, meshing with a counting mechanism consisting of a train of gears 14 to 16, inclusive, the gears being connected and provided with indicating-pointers 19, co-operating with dials 20, so as to indicate the number of disks passed down the conduit. In the present instance I have shown ten recesses in the wheel 8; but this number could of course be increased or diminished, and the gears arranged accordingly, so as to properly register and indicate on the dials the number of disks passed down to the ballot-boxes. The levers 11 are connected by links 21 with arms 22, secured to the rear sides of the shafts 1, and are so arranged that when they are in normal position they will project down between abutment 10 and wheel 8, as indicated by the full lines in Fig. 10; but when the shafts are rotated forward to deposit the ballots on the carrying-plates in the conduit said arms will be raised, as in the upper dotted lines in Fig. 10, permitting the ballot to roll down into wheel 8, when the return of the shafts to normal position will cause the depression of the arms again, pushing the ballot through and registering on the counting mechanisms which contain ballots, but no others.

The conduit 12, leading from the counters to the ballot-boxes 23, are preferably formed of metal tubes slightly greater in width and thickness than the ballots, so that the latter can move down edgewise without danger of catching, and any curves in the conduit are very gradual.

Figure 8:
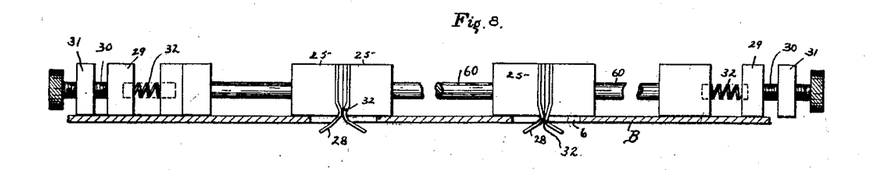
Fig. 8, a bottom plan view of the series of spacing blocks or slides between which the ballots are inserted.

For the purpose of preventing a person voting for more than one candidate for the same office, and also to provide for properly receiving the ballots, I arrange the apertures $b$ for all the candidates for the same office in a single line and provide means whereby upon the insertion of a ballot in one aperture all the other apertures will be closed and held closed, preventing the introduction of ballots in them until the voter leaves the proximity of the apertures and the ballots are deposited. The devices for carrying out this portion of my invention are shown particularly in Figs. 8 and 11, to which reference is made.

Just back of each of the apertures $b$ are arranged two blocks or plates 25, each guided and supported upon partition B, (preferably by means of small plates 26, adapted to enter grooves 27, formed in the top and bottom of said blocks,) and provided with slightly bent-out arms or fingers 28, preferably grooved slightly to facilitate the introduction of a disk-ballot between them. The adjoining blocks of the different apertures are preferably connected in the present instance by rods 60, and at the ends of the series are arranged blocks 29, carried upon adjustable screws 30, passing through stationary brackets 31, and between said blocks and the ends of the last blocks connected by the rods are arranged springs 32, operating to press all the blocks toward each other and to keep said fingers 28 near the centers of the apertures $b$. The space taken up by the springs may be slightly greater than the width of a single ballot-disk, but not twice as great—that is, the springs when extended separate each of the end blocks from the stationary blocks a distance equal to slightly more than one-half the width of a ballot, so that when a ballot is pushed in between any two of the blocks those in opposite sides will be moved in opposite directions and. held together, closing all the other apertures and preventing the introduction of other disks in the same line. The amount of motion permitted the blocks can be adjusted at any time by means of screws 30. The lower rear sides of the blocks are cut away, as shown in the bottom plan view, Fig. 8, and projections 32 are provided toward the front, so that the operator must push his ballot in until the center of the disk is beyond these projections, when the springs 29, moving the blocks together, will force it backward in proper position in the supporting-plate and prevent its accidental movement and insure the proper deposit when the carrier is operated. The ballot-supports being in normal position, raised to the level of aperture b, the ballots inserted in each aperture will rest in them in such position as to hold the blocks separated and the other apertures in the line closed while the supports are held in this position, and as the ballots are thus held until the voter leaves the proximity of the apertures the possibility of inserting more than one ballot in the same line is precluded. The springs 28 also serve a further useful purpose, in that after a ballot has been deposited by the dropping of the support the blocks will be returned to normal position, so that the next voter will not be able to ascertain how his predecessor voted.

Figures 4, 12:
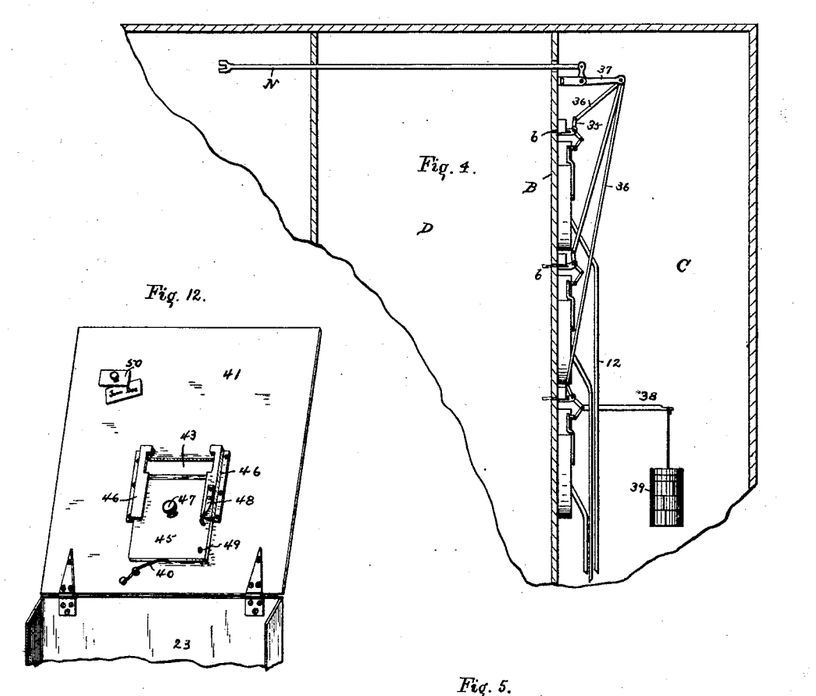
Fig. 4, a sectional view on the line $y$ $y$ of Fig. 2.
Fig. 12, a view of one of the ballot-receiving boxes open.
Figures 6, 7:
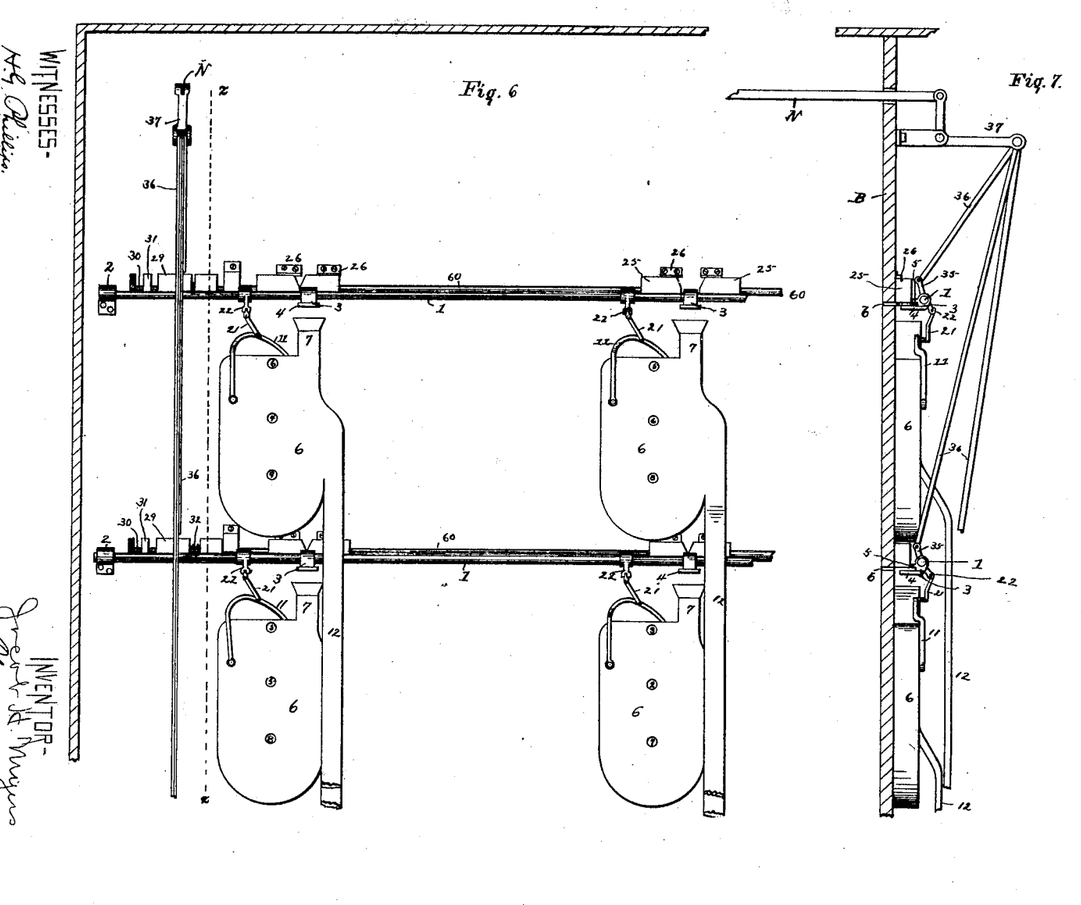
Fig. 6, a rear view of a portion of said partition, showing the disposition of the counting apparatus.
Fig. 7, a sectional view on the line $z$ $z$ of Fig. 6.

Each of the shafts 1 is provided near one end with an arm 35, connected by a link or rod 36 with yoke formed on one arm of a bell-crank lever 37, pivoted to partition B and connected by a rod or link N with lever M, operated by the door F, as shown in Figs. 4, 6, and 7, so that when the lever M is moved back the bell-crank will be operated and all the shafts 1, through links 36, oscillated forward, depositing the ballots that are on the supports 3 in the counters and raising levers 11 to allow the ballots to come in contact with the wheels 8 of the counters. For the purpose of returning these shafts to normal position and holding them there, and also assisting to close door F, the lower or any of the series of shafts 1 is provided with a rearwardly-extending arm 38, to which is attached a weight 39, adapted to be raised when the door is opened and the operation just described accomplished, and then operating to turn the shafts back and close the door, this movement also depressing levers 11 and pushing the ballots through the counters containing them, thereby counting and allowing them to pass down into the ballot-boxes.

Figures 13, 14, 15, 16, 17, 18:
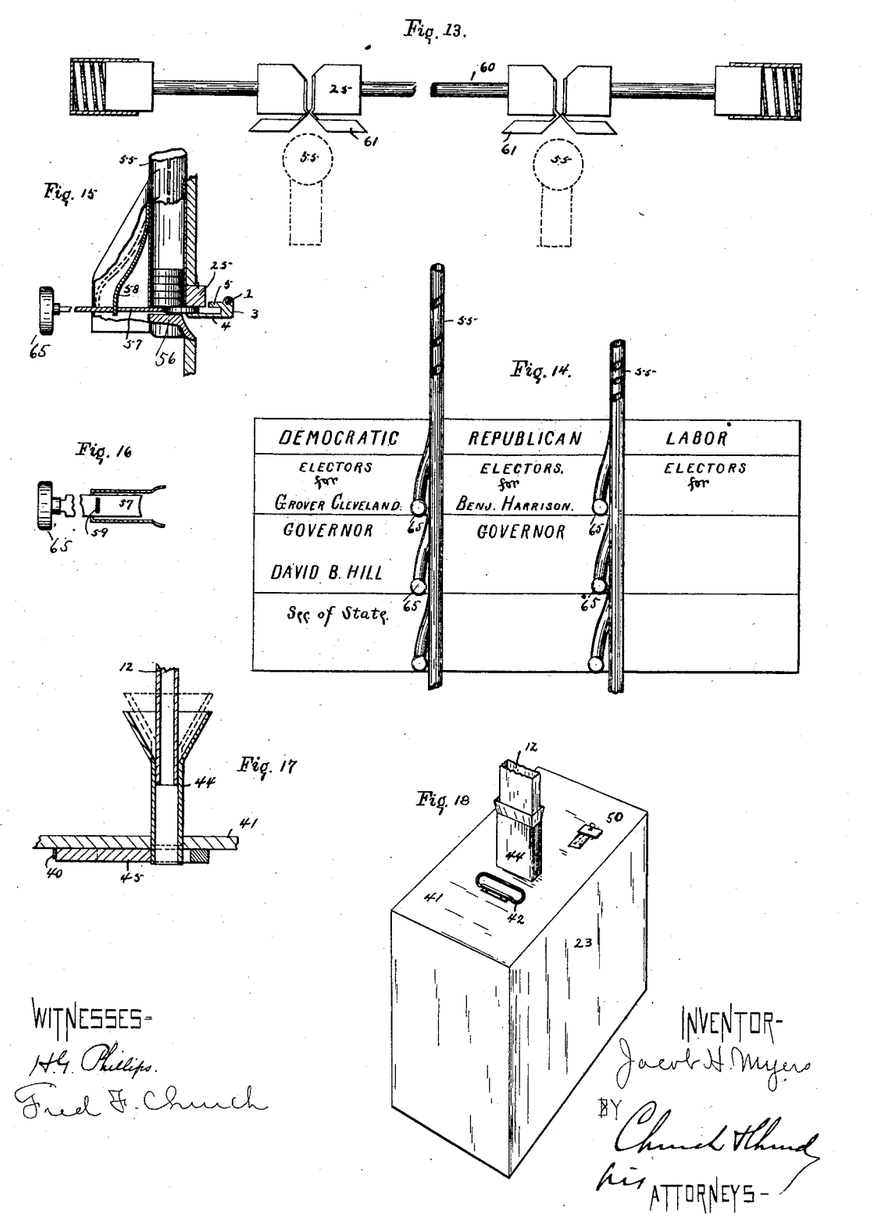
Figs. 13 to 16, inclusive, views of a modified form of ballot-depositing apparatus.
Fig. 17, a sectional view showing the connection between the ballot-conduit and receiving-box.
Fig. 18, a view of a ballot-box.

In Figs. 12, 17, and 18 are shown one of the ballot-boxes 23, which I preferably construct of metal, having a hinged cover 41, secured by a suitable lock, and a handle 42 for convenient transportation. In the cover is provided a suitable slot 43, through which the ballots are passed, and as it is desirable that all access to the interior of the boxes be prevented after a ballot has been taken, except by opening the lid, the keys of which are kept by the proper custodians, I locate upon the lower ends of the conduit 12, leading to the boxes, suitable movable conduit-sections 44, adapted to project a short distance down through the slot 43 and there engage an automatically-operated slide or door 45, held open by the section 44 while in the slot, but closed and locked when it is withdrawn. As shown in Fig. 12, this slide operates on the under side of the lid in suitable ways or guides 46, affixed thereto, having a knob 47 on it for facilitating operation and projected in a direction to close the slot by a spring 40, operating on one end, the slide being shown open with the spring under tension in said figure for convenience of illustration. Mounted upon one of the guides 46 is a spring-catch 48, having a projection on its free end adapted to enter a recess 49 in the slide when the latter is closed, thus locking it, and, being on the inside, when once the slide is locked closed it cannot be opened except by raising the lid. Upon the outside and inside of the box-lids are provided suitable catches 50 for holding cards or signs bearing the names of the candidates for whom the boxes are to be used, and the boxes are further numbered and each one is in use to be applied to the correspondingly-numbered conduit 12, the object in thus placing the names of the candidates in the inside as well as the outside being that should there be any contest or question regarding the number of votes cast for a candidate the individual ballots could be counted and the number indicated by the corresponding counter verified, though this would be unnecessary, as the counters could not be operated except by a ballot deposited in the regular way. In placing the box in position the slides are drawn back and held. Then the movable conduit-section 44 is slid down until below the level of said slide, holding it, as in Fig. 17, against the spring, and after the election is over this section 44 is withdrawn, allowing the spring to project the slide and the catch to hold and lock it, preventing access either to deposit or abstract ballots.

Voters, both those unable to read and others, may be instructed in the use of the apparatus by a fac-simile of the front of partition B, giving the location of the apertures in which the votes for the various candidates should be deposited, so that when the voter enters the booth or room to cast his ballots he will know how to proceed.

The booth, if a separate structure can be set up in the room where the election is to be held, or any chamber can be divided off into compartments substantially as herein shown; but in any event the judges and inspectors of elections are in front of the entrance to the booth and pass upon the qualification of the voter, and if he is found qualified he enters door E and closes it behind him. Inside the booth he will find a quantity of ballots in the form of metal disks marked in any suitable manner, as may be determined, as with the word "Ballot," and uniform in all respects, and taking several of these he presses one in each of the apertures devoted to the candidates he wishes to vote for, the spring-blocks preventing his depositing more than one in a line devoted to the candidates for a particular office, said ballots remaining in position in sight until he leaves the room. Going out he passes through doors H and F, as before described, the operation of opening door F turning down the ballot-supports and depositing his ballots in the counters through the medium of the connections described and the means for returning the devices to first or normal position, in the present instance the weight 35 causing the arms 11 to be moved down, forcing the ballots contained in the wheels 8 down into the conduits and ballot-boxes and counting them, and only counting those actually passed into the ballot-boxes.

At the close of the election the number of ballots cast for each candidate can be immediately ascertained by an inspection of the counters without the necessity of counting the individual ballots. The conduit-sections 44 are now withdrawn from the slits in the ballot-boxes and the slides allowed to close and lock themselves, preventing any fraudulent manipulation of the contents which may be stored away, and should any contest arise the ballots may be counted, the sign or card in the inside of the lid serving to designate the candidate even if the one on outside were displaced.

For the purpose of obviating the necessity of inserting the individual ballots by hand I propose in some instances to employ vertical tubes 55 on the front of partition B—one for each candidate—containing vertical columns of ballot-disks, the ballots being fed in at the top in quantities by an attendant. The column of disks is supported upon a bottom plate 56, arranged on a level with the aperture $b$, and the ballots are pushed, one at a time, into the apertures between the blocks 25 (which are arranged as before described) by means of a pusher-plate 57, normally held pressed outward by a spring 58, entering a slot 59 therein, operating to move the lower disk backward and onto the supporting-plate 4, as in Figs. 15 and 16, said pusher being retracted to outermost position by its spring as soon as pressure on the knob 65 of the pusher is released. In order to obviate the liability of more than one pusher being operated at a time, the wings 61 on the blocks 25 are extended, as shown in Fig. 13, so that when one disk has been pushed in and the blocks 25 moved one way or the other the wings will come opposite the open side of the other disk-tubes and prevent another one in the same line being pushed out of the tube.

It will be understood that I do not desire to be confined to the construction of the inclosed booth herein shown, as the same objects could be accomplished by using turnstiles instead of the doors; but I prefer the described devices, because by their employment a secret ballot can be had, and voters cannot be intimidated, nor can they by any possibility cast more than a single ballot for an office, as the entrances to the ballot-boxes are effectually closed until the voter leaves their proximity, and his return is precluded.

I claim as my invention—

1. In a voting apparatus, the combination, with a chamber or compartment having an entrance-door, locking devices therefor capable of operation only from the outside, an exit-door, and locking devices therefor capable of operation only from the inside, of one or more ballot-indicating devices accessible from the inside of said compartment and connections between one of said doors and said ballot-indicating devices for causing their simultaneous operation, substantially as described.

2. In a voting apparatus, the combination, with a main chamber and balloting devices accessible therefrom, a releasing device for the ballots indicated, a second compartment, a door between it and the main chamber, and an exterior door opening from the second compartment, of a locking device for said exterior door, released by the closing of the door between the main and second compartment, and connections between one of said doors and the ballot-releasing devices for causing their simultaneous operation, substantially as described.

3. In a voting apparatus, the combination, with a main chamber or compartment and balloting devices accessible therefrom arranged to prevent the indication of more than a predetermined number of ballots, a releasing device for said indicating devices, a second compartment, a door between it and the main chamber, and an exterior door opening from the second compartment, of a locking device for said exterior door, released by the closing of the door between the main and second compartments, and connections between the indicator-releasing devices and the exterior door for causing their simultaneous operation, substantially as described.

4. In a voting apparatus, the combination, with a chamber or compartment having an entrance-door, locking devices therefor capable of operation only from the outside, an exit-door, and locking devices therefor capable of operation only from the inside, of one or more ballot-receiving apertures accessible from the inside of said compartment, ballot-depositing devices, and connections between one of said doors and the depositing devices for causing their simultaneous operation, substantially as described.

5. In a voting apparatus, the combination, with a main chamber or compartment and ballot receiving and depositing devices accessible therefrom, a second compartment, a door between it and the main chamber, and an exterior door opening from the second compartment, of a locking device for said exterior door, released by the closing of the door between the main and second compartment, and connections between the exterior door and ballot receiving and depositing devices for causing their simultaneous operation, substantially as described.

6. In a voting apparatus, the combination, with a series of ballot-receiving passages, of a series of counters arranged therein, each arranged to be operated by the passage of a ballot, and pushers for forcing ballots through said counters, substantially as described.

7. In a voting apparatus, the combination, with a series of ballot-receiving passages, of a series of counters arranged to be operated by the passage of a ballot, pushers for forcing ballots through the counters, and connections between said pushers for causing their simultaneous operation, substantially as described.

8. In a voting apparatus, the combination, with a series of ballot-receiving passages, of a series of counters arranged to be operated by the passage of a ballot, devices for forcing ballots through the counters, connections between said devices for causing their simultaneous operation, a door or barrier, and connections between it and the ballot-forcing devices for causing their simultaneous operation, as set forth.

9. In a voting apparatus, the combination, with a chamber or compartment and a door opening therein, of a series of ballot-receiving apertures in said compartment, a series of passages leading therefrom, a series of ballot-supports, a series of counters connected to the passages, each arranged to be operated by a ballot, devices for forcing ballots through the counters, and connections between the supports, ballot-forcing devices, and the door whereby the two former will be operated by the movement of the latter, substantially as described.

10. In a voting apparatus, the combination, with a chamber or compartment having a door therein, of one or more ballot-receiving apertures in said chamber, a passage leading therefrom and a ballot-support in said passage, a pivoted lever arranged near the door, with which the door co-operates when closed to hold it in one position and arranged to be moved by the door when opened, and connections between said lever and ballot-support for causing their simultaneous operation, substantially as described.

11. In a voting apparatus, the combination, with a chamber or compartment having a door therein, of one or more ballot-receiving apertures in said chamber, a passage leading therefrom and a ballot-support in said passage, a pivoted lever arranged to be operated by the door having the straight and curved portions, and connections between said lever and ballot-support for causing their simultaneous operation, substantially as described.

12. In a voting apparatus, the combination, with a series of ballot-receiving apertures and a series of ballot-supports arranged in proximity thereto, of a series of blocks or plates free to move across said aperture, the aggregate amount of movement permitted the series being less than twice one of the dimensions of the ballots employed, whereby the introduction of more than one ballot is prevented, substantially as described.

13. In a voting apparatus, the combination, with a chamber or compartment having a door therein, of a series of ballot-receiving apertures in said chamber, a series of ballot-supports arranged in proximity thereto, a series of blocks or plates free to move across said aperture, the aggregate amount of movement permitted the series being less than twice one of the dimensions of the ballots employed, whereby the introduction of more than one ballot is prevented, and connections between the ballot-support and said door whereby the operation of the latter will move the former, substantially as described.

14. In a voting apparatus, the combination, with two or more ballot-receiving apertures and two or more pivoted ballot-supports having the fingers between which and the support the ballots are placed, of two or more sliding blocks arranged in proximity to the supports, operating when a ballot is in position on one support to close the other apertures and prevent the introduction of a second one, substantially as described.

15. In a voting apparatus, the combination, with a ballot-receiving aperture, of a pivoted ballot-support arranged in proximity thereto, having the plate and finger between which the ballot is placed, and means for tilting said support to carry the ballot away from the aperture, substantially as described.

16. The combination, with a pivoted ballot-support, of a counter operated by the passage of a ballot, an arm or lever operating to move the ballot through the counter, and connections between the ballot-support and counter whereby the arm will be operated to move a ballot through the counter when the support is returned to normal position, substantially as described.

17. The combination, with a pivoted ballot-support, of a counter operated by the passage of a ballot, an arm or lever operating to move a ballot through the counter, and connections between the ballot-support and counter for causing their simultaneous operation, and means, such as a weight, for returning the parts to normal position, substantially as described.

18. The combination, with a shaft having a ballot-support thereon and an arm connected thereto, of a counter operated by the passage of a ballot, an arm or lever operating to move a ballot through the counter, and a link connecting the arm on the shaft and the last-mentioned lever, substantially as described.

19. The combination, with an oscillating shaft having a series of ballot-supports thereon, of a series of counters operated by the passage of ballots, a series of arms or levers operating to move the ballots through the counters, and connections between said arms and the shaft for causing their simultaneous operations, substantially as described.

20. The combination, with a series of ballot-receiving apertures, a series of ballot-supports in proximity thereto, and a series of movable blocks or plates arranged, substantially as described, to prevent the introduction of more than one ballot, of a series of counters operated by the passage of a ballot, a series of arms or levers for moving ballots through the counters, and connections between said ballot-supports and arms for causing their simultaneous operation, as set forth.

21. The combination, with a series of ballot-receiving apertures, of a series of ballot-supports arranged in proximity thereto, a series of movable blocks or plates arranged, substantially as described, for closing the apertures and preventing the introduction of more than one ballot, and devices, such as springs, for holding said blocks over said openings, as set forth.

22. The combination, with a series of ballot-receiving apertures and a series of ballot-supports, of a series of blocks or plates arranged, substantially as described, for closing the apertures and preventing the introduction of more than one ballot, and one or more adjustable stops for limiting the movement of said blocks, substantially as described.

23. In a voting apparatus, the combination, with a series of ballot-receiving apertures, a series of ballot-receptacles, and passages connecting them, of a series of counters in said passages operated by the passage of a ballot, a series of pushers operating to force ballots through the counters, and devices for actuating said pushers simultaneously, substantially as described.

24. In a voting apparatus, the combination, with a series of ballot-indicators and interlocking devices between said indicators and operated directly by the latter for preventing more than one indicator in the series being operated, of a series of counters—one for each indicator—operated only by the indicators, and devices for causing the positive simultaneous operation of the indicated counters and none others, substantially as described.

25. In a voting apparatus, the combination, with a chamber having a door therein, of a series of ballot-indicators accessible from the interior of the chamber, interlocking devices between said indicators and operated directly by the indicator for preventing more than one in the series being operated, a series of counters—one for each indicator—operated only by the indicators, and devices for moving the indicators and counters positively relative to each other connected to the door, whereby only the counters designated will be operated, substantially as described.

26. In a voting apparatus, the combination, with a chamber or booth having a door therein, of movable blocks or plates inside said chamber, between two of which a single ballot may be placed, operating to hold the others together, preventing the introduction of a second one, devices, substantially as described, for removing or releasing the indicating device, and connections between said door and the releasing devices for operating the latter from the former, as set forth.

27. In a voting apparatus, the combination, with a series of ballot-receiving apertures, a series of ballot-reservoirs, and a series of push-keys for forcing a single ballot from each reservoir into the apertures, of a series of counters—one for each aperture—actuated by the ballots, substantially as described.

28. In a voting apparatus, the combination, with a series of ballot-receiving apertures, a series of ballot-reservoirs, and a series of push-keys for forcing a single ballot from each reservoir into the apertures, of a series of plates or blocks for preventing the introduction of more than a predetermined number of ballots into the apertures in the series, substantially as described.

JACOB H. MYERS.

Witnesses:
FRED F. CHURCH,
S. E. TRUE.